United States Patent
Woest

(10) Patent No.: US 7,197,935 B2
(45) Date of Patent: Apr. 3, 2007

(54) PRESSURE TRANSMISSION SYSTEM COMPRISING A DEVICE FOR IDENTIFYING MEMBRANE RUPTURES AND CONNECTION ADAPTER COMPRISING A DEVICE FOR IDENTIFYING MEMBRANE RUPTURES

(75) Inventor: Wolfgang Woest, Rheinfelden (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 87 days.

(21) Appl. No.: 10/481,418

(22) PCT Filed: Jun. 15, 2002

(86) PCT No.: PCT/EP02/06613

§ 371 (c)(1), (2), (4) Date: Aug. 9, 2004

(87) PCT Pub. No.: WO03/004984

PCT Pub. Date: Jan. 16, 2003

(65) Prior Publication Data

US 2004/0244494 A1 Dec. 9, 2004

(30) Foreign Application Priority Data

Jun. 30, 2001 (DE) .................. 101 31 855

(51) Int. Cl.
G01L 9/16 (2006.01)

(52) U.S. Cl. ........................ 73/706; 324/663

(58) Field of Classification Search .................. 73/706, 73/700, 715; 324/663
See application file for complete search history.

(56) References Cited

U.S. PATENT DOCUMENTS 5,072,190 A 12/1991 Martin
5,760,310 A * 6/1998 Rud et al. ..................... 73/706

FOREIGN PATENT DOCUMENTS

| DE | 39 41 369 A1 | 4/1991 |
| DE | 199 49 831 A1 | 4/2001 |
| EP | 0 838 672 A1 | 4/1998 |

* cited by examiner

Primary Examiner—Edward Lefkowitz
Assistant Examiner—Andre Allen
(74) Attorney, Agent, or Firm—Bacon & Thomas, PLLC

(57) ABSTRACT

A pressure transmitter for transferring a pressure from a pressure prevailing in a first medium onto a second medium includes a pressure chamber between a platform and a dividing membrane, wherein the pressure chamber is fillable with the second medium and has a pressure chamber opening, through which the pressure can be transmitted by means of the second medium to a pressure measurement cell. The pressure transmitter includes a sensor for monitoring a material property of the second medium, preferably a conductivity sensor with at least one electrode, which sensor can detect contaminants in the second medium from the first medium following a rupture of the dividing membrane on the basis of changes in the monitored material property. The sensor is in flow connection with the pressure chamber by way of the pressure chamber opening.

8 Claims, 2 Drawing Sheets

PRESSURE TRANSMISSION SYSTEM COMPRISING A DEVICE FOR IDENTIFYING MEMBRANE RUPTURES AND CONNECTION ADAPTER COMPRISING A DEVICE FOR IDENTIFYING MEMBRANE RUPTURES

FIELD OF THE INVENTION

The invention relates to a pressure transmitter, or mediator, with diaphragm seal, for transferring a pressure from a pressure prevailing in a first medium onto a second medium, more specifically to pressure transmitters having: a platform; a dividing, or separating, membrane, or diaphragm, which is secured at its edge onto the platform, wherein a first surface of the dividing membrane, facing away from the platform, can be brought into contact with the first medium, and a second surface of the dividing membrane, facing toward the platform, forms with the platform a pressure chamber, which can be filled with the second medium, wherein the pressure chamber has a pressure chamber opening, through which the pressure can be transferred by means of the second medium; and a sensor for monitoring a property of a medium contained in the chamber.

BACKGROUND OF THE INVENTION

Devices of this type are, in addition to other uses, used for pressure measurement in aggressive media. The dividing membrane is contacted with an aggressive first medium and the pressure prevailing in the first medium is transferred to a second medium in the pressure chamber. There, the pressure is conducted over a suitable pressure conducting line to a pressure measurement cell. Pressure transfer using a pressure transmitter and an attached pressure line can, however, also be desired in the case of non-aggressive media, for bridging large distances between the first medium and the location of the pressure measurement cell.

Incompressible oils are preferably used as the second medium for pressure transmission. In so far as such a substance is suited for contaminating a medium being measured, and for various other reasons, it is necessary to recognize early that there is a leak in the dividing membrane, or a rupture of the dividing membrane. To this end, Bastiaan discloses in the European patent application EP 0 838 672 a pressure transmitter, in which the pressure chamber has in its wall a dead-end hole, in which the electrode of a conductivity sensor is arranged. In such case, when the dividing membrane breaks, the first medium diffuses into the pressure chamber and into the dead-end hole, whereupon a change in the conductivity is detectable, provided that the first medium has a conductivity which deviates significantly from that of the second medium. This is especially the case, when the first medium is a corrosive medium and the second medium is an oil.

For the various pressure measurement applications, there is an immense number of pressure transmitters, which are fitted to the different demands of the applications. A very high manufacturing cost is required to equip this multiplicity of sensors with the conductivity probe proposed by Bastiaan. Additionally, the arrangement of Bastiaan needs a minimum diameter of 1.5 inches, or 3.8 cm, for placing the conductivity sensor next to the pressure conducting line, as follows from the applicant's product description "Badoterm's MDS Diaphragm Leakage Detection System" for a product corresponding to the subject matter of the application. Such a constraint is unacceptable for many applications.

Moreover, transport of the contaminants to the sensor happens purely diffusively in the described pressure transmitter. This can lead to a large time delay between the occurrence of a leak and the detection of the contamination resulting therefrom, depending on the depth of the dead-end hole and the particulars of the installation of the pressure transmitter.

SUMMARY OF THE INVENTION

It is, consequently, an object of the present invention to provide an improved pressure transmitter, which overcomes the disadvantages of the prior art.

The object of the invention is achieved by a device for transferring a pressure from a pressure prevailing in a first medium onto a second medium and by a connection adapter.

The pressure transmitter for transfer of a pressure from a pressure prevailing in a first medium onto a second medium comprises: a platform; a dividing membrane, which is secured at its edge onto the platform, wherein a first surface of the dividing membrane, facing away from the platform, can be brought into contact with the first medium, and a second surface of the dividing membrane, facing the platform, forms with the platform a pressure chamber, which can be filled with the second medium, wherein the pressure chamber has a pressure chamber opening, through which the pressure can be transmitted by means of the second medium; and a sensor for monitoring a material property of the second medium, wherein the sensor is in flow connection with the pressure chamber by way of the pressure chamber opening. Preferably, the sensor is a conductivity sensor. Additionally, the sensor can be a capacitive sensor, which monitors the relative dielectric constant of the second medium.

Following the occurrence of a leak in the dividing membrane, the material properties of the second medium are changed by contaminants from the first medium. In so far as the contaminants spread, at least at constant temperature and constant pressure, essentially diffusively, the sensor should preferably be spaced at a maximum so far from the dividing membrane, that the expected diffusion time of the contaminants from a leak in the membrane to the sensor does not exceed a given time span. Depending on requirement, which essentially is determined by the context in which the sensor is being applied, this time span can be in the range of minutes, hours, days or weeks. In order to be able to apply the pressure transmitter of the invention as universally as possible, the sensor element should be arranged with the smallest possible separation from the dividing membrane.

When the sensor is a conductivity sensor, it includes at least two mutually separated electrodes, and the space between the electrodes is filled, at least partially, with the second medium. The sensor can, for example, exhibit a first and a second electrode, which are each electrically insulated from one another and from the platform or pressure supply line, as the case may be, or the sensor can exhibit a first electrode, which is insulated from the platform or the pressure supply line, as the case may be, and the platform or supply line serves as the counter electrode. A capacitive sensor can exhibit the same arrangement of the electrodes as a conductivity sensor.

In a preferred embodiment, the platform of the pressure transmitter includes a line connection for connecting a pressure conducting, or supply, line, transmitting the pressure to a pressure transducer. The pressure chamber opening opens into this line connection. The sensor can now, for example, be arranged in the line connection or in a connection adapter with which the pressure conducting line is attached at the line connection.

The connection adapter includes a pressure transmitter connection, which is complementary to that of the line connection, and a pressure line receiver. The connection adapter includes, additionally, a first electrode and a second electrode of the sensor. The pressure line receiver can, for example, have a chamber in the connection adapter, into which chamber the pressure conducting line opens. The first electrode and the second electrode can, for example, be secured in an opening of the chamber by means of a glass bushing. Particularly preferred is an embodiment where the pressure conducting line is likewise secured by means of a glass bushing, especially the same glass bushing.

The arrangement of the sensor for monitoring a material property of the transfer medium in the pressure chamber opening or in another section communicating with the pressure chamber by way of the pressure chamber opening has, additionally, the advantage that it leads also to a transport of the contaminants by convection, or flow, of the transfer medium.

This should frequently cause a faster detectability of the contaminants than the purely diffusive transport in the arrangement of Bastiaan. Assuming, for example, a pressure chamber working volume of 100 mm$^3$ and an opening diameter of 1 mm, then this means during an overload pressure pulse a displacement of the total working volume in the opening by about 127 mm. In this way, the contaminants can reach the sensor with the transfer medium considerably faster than is the case with the arrangement of Bastiaan.

Equally, temperature fluctuations can lead to a convective transport of the contaminants. A temperature change in the pressure conducting line of, for example, 10° C. leads, in the case of a volume expansion coefficient of about $10^{-3}$/K, a pressure conducting line length of 10 m and an internal diameter of 1 mm, to a volume change of about 80 mm$^3$, which corresponds to a movement of the liquid column of about 100 mm at the end of the pressure conducting line. The described convective transport to the sensor is more effective, the longer the length of the pressure conducting line in comparison to the separation of the sensor from the dividing membrane.

For optimum utilization of this effect, the elements of the sensor, for example the electrodes of a conductivity sensor, should be arranged, as much as possible, in, or immediately bordering, an area of the pressure chamber opening, the pressure conducting line, or a connection adapter between the pressure transmitter and the pressure conducting line, where the described convection flow flows through.

BRIEF DESCRIPTION OF THE DRAWINGS

The invention will now be explained in more detail on the basis of the drawings, which show as follows.

DETAILED DESCRIPTION

Figure 1:
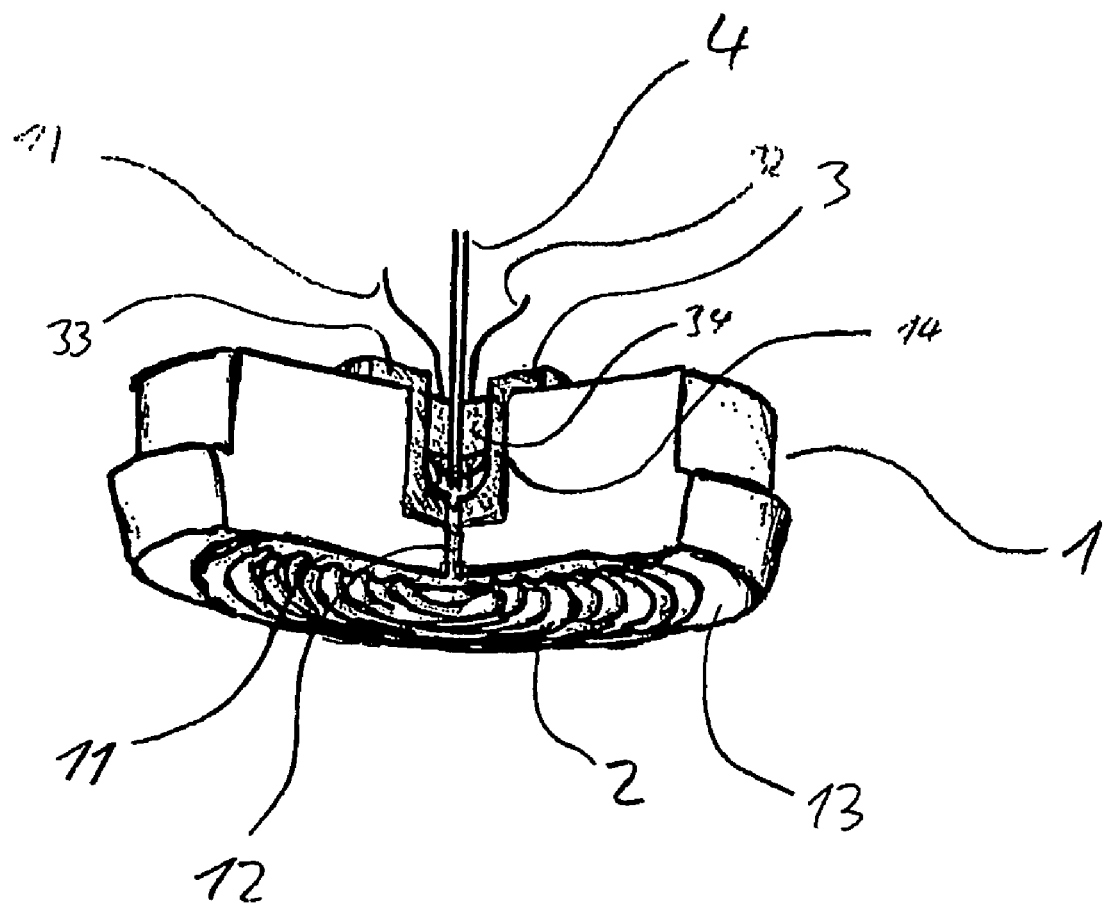
FIG. 1: A perspective, cross-sectional drawing of a preferred embodiment of a pressure transmitter of the invention.

The pressure transmitter shown in FIG. 1 includes a platform 1, which has a preferably essentially cylindrically symmetric construction. Dividing membrane 2 is secured at its edge 21 onto the front side 13 of the platform, so that a pressure chamber 11 is formed between the dividing membrane 2 and the platform. The front side 13 of the platform 1 can be provided in usual manner with a membrane bed, against which the dividing membrane 2 is pressed in the case of overload.

The pressure chamber 11 has an opening 12 for transmission of the pressure prevailing in the pressure chamber. The opening 12 is preferably constructed as a capillary line. Opening 12 extends in the preferred embodiment to a pressure line connection 14, which preferably is in the form of an essentially cylindrical, or axially symmetric, recess on the side of the platform 1 opposite to that containing dividing membrane 2.

Figure 2:
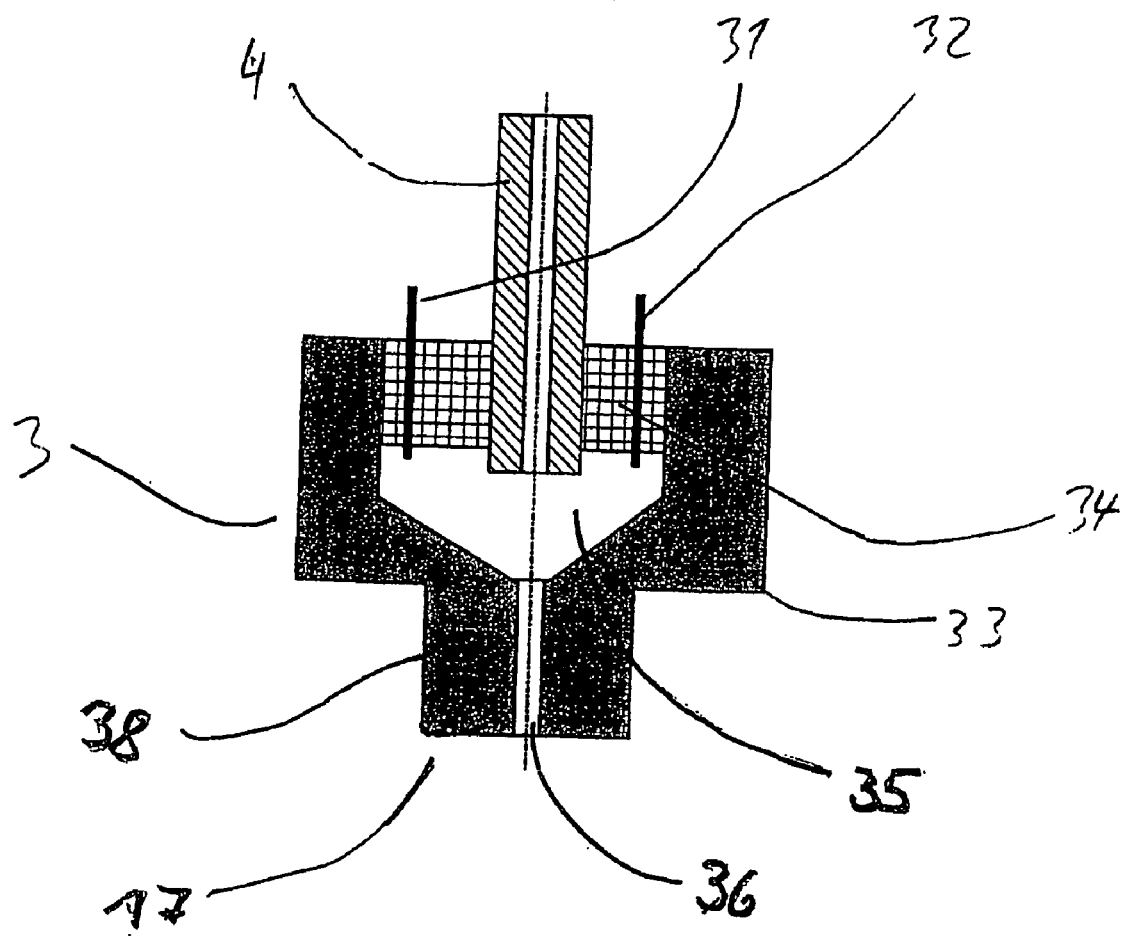
FIG. 2: A preferred embodiment of a connection adapter of the invention.

The connection of the pressure conducing line 4 occurs, in a preferred embodiment, by means of a connection adapter 3, in which the sensor for monitoring a material property is integrated. Details of the connection adapter 3 will now be described on the basis of reference also to FIG. 2. The proportions of individual elements of the embodiment of a connection adapter shown in FIG. 2 differ from those of the embodiment of the connection adapter in FIG. 1. In both drawings, however, identical reference characters are used for corresponding elements.

The connection adapter 3 includes a pressure transmitter connection 37 complementary to the line connection 14 and a pressure line receiver, which is formed in a preferably cylindrical, first section 33. The connection adapter 3 includes, additionally, a first electrode 31 and a second electrode 32 of the sensor.

The pressure transmitter connection 37 can, for example, include an essentially cylindrical, or conical, projection, which extends in the axial direction from an end surface of the first section 33 and contains a canal 36, through which a flow connection is created between the pressure chamber opening 12 of the pressure transmitter 1 and the pressure line receiver.

In so far as the cylindrical projection has a smaller radius than the first section 33, the end surface of the first section outside of the cylindrical projection acts as an axial abutment surface, which defines the position of the connection adapter 3 with reference to the platform 1 and, at the same time, effects a (perhaps supplemental) seal between the platform 1 and the connection adapter 3.

The lateral surface 38 of the essentially cylindrical projection can also, if required, be provided with an outer screw thread complementary to an internal thread in the wall of the pressure line connection 14.

The pressure line receiver can, for example, have a chamber 35 in the connection adapter 3, and the pressure conducting line 4 is placed with its inlet in this chamber 35. The sensor for monitoring a material property of the second medium, here the electrical conductivity, is, likewise, arranged in the pressure line receiver. The first electrode 31 and the second electrode 32 of the sensor can, for example, be secured in an opening of the chamber 35 by means of a glass bushing 34. Preferably, the pressure conducting line is likewise secured by means of a glass bushing, wherein especially the same glass bushing 34 can be used. Equally, it is possible to secure the two electrodes, or the pressure conducting line, as the case may be, each in a separate opening by means of a glass bushing or another suitable means of securement.

The chamber 35 should, on the one hand, be sufficiently large that the electrodes can be positioned insulated from one another and that a suitable space filled with the second medium, or a transfer fluid, as the case may be, extends between the electrodes. Moreover, the transport of contaminants in the vicinity of the electrodes should occur as fast as possible. Therefore, paths as short and direct as possible, with large cross sections, should exist between the canal 36 in the pressure transmitter connection 37 and the electrodes. In so far as the canal 36 is likewise a section of the path of contaminants, the canal 36 should also exhibit as low a diffusion resistance as possible. On the other hand, the total volume of the transfer liquid in the system is to be kept as small as possible, in order to minimize the influence of temperature fluctuations on the total system.

Instead of two separate electrodes, it is also possible to provide only one electrode and to measure the conductivity between this one electrode and the platform, or the chamber.

Pressure conducting line 4 is preferably constructed as a capillary line. In the embodiment of the drawing, the capillary line is tubular; it can, however, be a bore in a massive block, for example in a dividing body, in which the sensor and the pressure connection adapter or a pressure transmitter connection can be integrated.

The pressure conducting line transmits the pressure present in the second medium to a pressure measurement cell (not shown in further detail), which produces a pressure-dependent, electrical signal.

The electrodes 31, 32 of the conductivity sensor are connected to a suitable evaluation circuit, which monitors the conductivity of the transfer medium. The monitoring can, for example, occur continuously, periodically, or be event-controlled, for example by querying by a microprocessor.

Even though, at the moment, conductivity sensors are preferred sensors for monitoring a material property of the transfer medium, the pressure transmitters of the invention can, fundamentally, utilize other sensors also. Suited additionally are, among others, capacitive sensors, pH-sensors, photometer or specific adsorption sensors, which detect the presence of a chosen foreign substance from the first medium, or the process medium, in the transfer medium.

The invention claimed is:

1. A device for transfer of a pressure from a pressure prevailing in a first medium onto a second medium, comprising:
   a platform;
   a dividing membrane, which is secured at its edge on said platform, wherein a first surface of said diving membrane, facing away from said platform, can be brought into contact with the first medium, and a second surface of said dividing membrane, facing toward said platform, forms with the platform a pressure chamber, which can be filled with the second medium, said pressure chamber has a pressure chamber opening, through which the pressure can be transmitted by means of the second medium;
   a pressure conducting line, which is in flow connection with said pressure chamber opening; and
   a sensor for monitoring a material property of the second medium, wherein:
   said sensor is in flow connection with said pressure chamber by way of said pressure chamber opening; and
   said sensor being mounted to the platform or to said pressure conducting line adjacent to the platform.

2. The device as claimed in claim 1, wherein:
   said sensor is a conductivity sensor.

3. The device as claimed in claim 2, wherein:
   said conductivity sensor has a first electrode and a second electrode, which are insulated from one another and from said platform.

4. The device as claimed in claim 2, wherein:
   said conductivity sensor has an electrode, which is arranged insulated from said platform, in order to measure the conductivity of the second medium between said electrode and said platform or components conductively connected with said platform.

5. The device as claimed in claim 1, wherein:
   said pressure conducting line is a capillary line.

6. The device as claimed in claim 1, further comprising:
   a connection adapter, which connects said pressure conducting line with said pressure chamber opening.

7. The device as claimed in claim 1, wherein:
   said connection adapter includes said sensor.

8. The device as claimed in claim 1, wherein:
   a variable pressure loading of said dividing membrane and/or a volume change of the second medium due to temperature fluctuations within a given working range of the device leads to a flow of the second medium through said pressure chamber opening;
   said sensor is arranged at such a distance from said pressure chamber that at least a part of the medium contained in said pressure chamber at 50% of the nominal pressure and at the average temperature of the nominal temperature range of the device flows to the position of said sensor at a compression of said pressure chamber of not more than 30%, preferably not more than 20%, especially preferably not more than 10%.

* * * * *